Patented Nov. 25, 1947

2,431,315

UNITED STATES PATENT OFFICE 2,431,315

PROCESS OF FORMING PLASTIC COATING COMPOSITIONS ON SURFACES

Folsom E. Drummond, Dayton, Ohio, assignor, by mesne assignments, to Chemical Developments Corporation, Dayton, Ohio, a corporation of Ohio No Drawing. Application March 11, 1941, Serial No. 382,776

5 Claims. (Cl. 117—106)

My invention relates to an improved method of producing plastic coatings on the surface of articles.

It is a principal object of this invention to device an improved method of providing articles with a tough resilient coating film without the application of heat.

Heretofore it has been the conventional practice to apply protective coating compositions to articles in the form of liquid and baking the coating to form a hard film thereon. Similarly, in the application of plastic compositions, such as in plastic injection molding, use has been made of pressure molds for applying plastic compositions to different articles. All of the processes utilized heretofore require the use of expensive equipment, such as baking ovens, molds and temperature producing means for drying the coating film or processing the plastic material.

My invention eliminates the necessity for employing expensive equipment in the application of plastic and resinous coatings in order to form a protective coating finish film on articles.

The essential feature of my method of forming protective coatings on articles comprises applying a suitable solution of polymerizable substances containing conjugated double bonds and bringing about the rapid polymerization of the material by dispersing catalysts throughout the mass as it is applied to a supporting surface. The particular catalyst employed depends upon the substances to be polymerized and is selected so as to bring about cold or ordinary room temperature polymerization in situ upon application of the polymerizable solution to the article. By controlling the conditions of application of the polymerizable coating and selecting the most active catalyst the time for finishing the articles can be varied and the desired film characteristic produced.

As typical examples of my process, the following are illustrative:

Example I

A tough resinous coating is formed in situ on the surface of the article to be coated by spraying chloroprene and liquid cesium as a catalyst simultaneously onto the surface. Preferably the catalyst is introduced into the chloroprene in the form of an atomized spray as the chloroprene is applied on the article. The process is carried out at ordinary room temperature, i. e., 75 degrees F. or lower. Catalyst in the amount of from 0.5 to 3 per cent may be used which is intimately and uniformly mixed with the chloroprene. The presence of oxygen assists in accelerating the polymerization of the chloroprene. If desired, 1 to 1.5 per cent of a peroxide can be incorporated in the chloroprene to enhance the rate of polymerization of the coating to a solid film.

Preferably the chloroprene is used in concentrated form or admixed with benzene so as to provide a sprayable solution. Cesium is liquid at ordinary room temperature. In place of cesium other suitable catalyst may be used, i. e., sodium or rubidium. These substances may be utilized in colloidal solutions such as silicates.

Example II

A resinous coating may be formed on an article similarly as in Example I by intimately admixing isoprene and liquid cesium as a catalyst with or without the addition of peroxides and immediately applying the mixture on the surface to be coated. The accelerated polymerization of the isoprene is effected at ordinary room temperature, for instance, at 75 degrees F. or lower, as in the process described in Example I.

Example III

In this instance, styrene is applied to the surface to be treated simultaneously with a solution of stannic chloride. The substances may be intimately mixed together immediately prior to application or simultaneously as they are applied. The amount of catalyst is adjusted so as to produce the desired rate of polymerization of the styrene so as to produce a tough resinous coating. The process is conducted under ordinary atmospheric and room temperature conditions and, if desired, ultraviolet light may be utilized to further accelerate the polymerization.

In the above examples, it will be understood that other suitable catalysts than those mentioned may be utilized, such as sodium, antimony chloride, aluminum chloride and pentene-2, or a mixture of different catalysts, the catalyst selected being one which accelerates the polymerization of the organic substance forming high molecular weight solid or semisolid resinous polymers. As the peroxide there may be employed benzoyl peroxide to accelerate the polymerization.

In order to effectively disperse the catalyst throughout the polymerizable hydrocarbon, as the latter is applied, the two substances may be sprayed simultaneously from separate containers so as to cause intermixing of the sprays just prior to contacting the surface being treated.

If desired, partially polymerized hydrocarbons of the character mentioned may be used in place of the unpolymerized substance so as to further decrease the time of polymerization of the hydrocarbon to form the resinous film. In place of the hydrocarbon substances mentioned in the examples, there may be used other unsaturated terpene hydrocarbons and dienes which can be catalytically polymerized without the application of heat to form tough, plastic, adherent coatings.

To control the polymerization so as to produce a coating film having the desired characteristics a retarding agent or inhibiter of polymerization may be sprayed or flowed onto the coating after the polymerization has progressed to the desired stage to inhibit further polymerization. As an example, hydroquinone dissolved in alcohol or other suitable solvent may be applied over the polymer coating film at the proper time.

Admixtures of polymerizable compounds may be employed and the polymerization controlled to produce either smooth or wrinkled finish surfaces. Further, instead of applying the initial substances in the form of a spray the hydrocarbon and catalyst may be thoroughly mixed together and flowed onto the surface.

Where the polymerized product is of too brittle a nature plasticizing agents, such as commonly used in nitrocellulose coatings may be incorporated in sufficient amount to produce the desired flexibility in the film. The essential step in the process is the application of a compound which will rapidly polymerize in the presence of oxygen and a catalyst to form a resinous or rubber-like film which is produced in situ by mixing the substances and immediately flowing the mixture or simultaneously mixing and applying the same to the surface on which the coating is to be formed. In instances where the surface of the film is soft and requires aging to produce a hard nonadherent film, soapstone, talc, or the like, may be applied over the surface to prevent sticking or adhering together of the articles until the polymerization has reached the stage such that a hard film is formed whereupon the covering powder can be washed off.

One or more coatings may be applied and polymerized in situ to form the resinous film so as to build up a plastic coating of the desired thickness.

It will be understood that modifications in the process of applying the polymerizable substances may be made to suit varying conditions and uses without departing from the spirit and scope of this invention as defined by the claims appended hereto.

Having thus fully described my invention, what I claim as new and desire to secure by Letters Patent is:

1. A method of providing a surface with a tough resinous coating comprising atomizing hydrocarbon material having conjugated double bonds, atomizing cesium, intimately mixing the hydrocarbon and cesium mists obtained, depositing the mixed spray on the article to be coated and allowing it to air dry.

2. A method of providing a surface with a tough resinous coating comprising simultaneously atomizing hydrocarbon material having conjugated double bonds and cesium from separate sources so as to obtain a thorough mixed spray of said hydrocarbon and said cesium, depositing said mixed spray on the surface to be coated, and allowing it to solidify.

3. A method of providing a surface with a tough resinous coating comprising atomizing hydrocarbon material having conjugated double bonds, atomizing cesium, intimately mixing the hydrocarbon and cesium mists obtained, depositing the mixed spray on the article to be coated, allowing it to polymerize, and arresting said polymerization when the desired consistency has been obtained by applying a polymerization inhibitor onto said resinous coating.

4. A method of providing a surface with a tough resinous coating comprising atomizing chloroprene, atomizing cesium, intimately mixing the chloroprene and cesium mists obtained, depositing the mixed spray on the article to be coated and allowing it to air dry.

5. A method of providing a surface with a tough resinous coating comprising atomizing isoprene, atomizing cesium, intimately mixing the isoprene and cesium mists obtained, depositing the mixed spray on the article to be coated and allowing it to air dry.

FOLSOM E. DRUMMOND.

REFERENCES CITED

The following references are of record in the file of this patent:

UNITED STATES PATENTS

| Number | Name | Date |
| --- | --- | --- |
| 2,095,250 | Heberer | Oct. 12, 1937 |
| 2,159,007 | Charch | May 23, 1939 |
| 2,028,776 | Hibbert | Jan. 28, 1936 |
| 2,055,322 | Teller | Sept. 22, 1936 |
| 2,174,887 | Kiefer | Oct. 3, 1939 |
| 2,123,152 | Rivat | July 5, 1938 |
| 1,950,430 | Calcott | Mar. 13, 1934 |
| 2,259,497 | Soday | Oct. 21, 1941 |
| 2,270,285 | Frolich | Jan. 20, 1942 |
| 1,073,116 | Harries | Sept. 16, 1913 |
| 2,209,746 | Ebert | July 30, 1940 |

OTHER REFERENCES

Davis & Blake, Chemistry of Technology of Rubber, 1937, page 683.